United States Patent
Lange et al.

(10) Patent No.: US 8,623,983 B2
(45) Date of Patent: Jan. 7, 2014

(54) TERPOLYMER OF ELECTRON-DEFICIENT OLEFINS, OLEFINS WITHOUT ELECTRON-WITHDRAWING SUBSTITUENTS, AND ALKOXYVINYLSILANES

(75) Inventors: Arno Lange, Bad Dürkheim (DE); Matthias Scheibitz, Weinheim (DE); Manoranjan Prusty, Mannheim (DE)

(73) Assignee: BASF SE (DE)

( * ) Notice: Subject to any disclaimer, the term of this patent is extended or adjusted under 35 U.S.C. 154(b) by 214 days.

(21) Appl. No.: 13/224,403

(22) Filed: Sep. 2, 2011

(65) Prior Publication Data

US 2012/0059101 A1 Mar. 8, 2012

Related U.S. Application Data

(60) Provisional application No. 61/380,329, filed on Sep. 7, 2010.

(51) Int. Cl.
*C08F 210/10* (2006.01)
(52) U.S. Cl.
USPC ..... 526/348.8; 526/272; 526/279; 526/348.3; 528/32; 528/396; 528/405
(58) Field of Classification Search
USPC .............. 526/272, 279, 348.3, 348.8; 528/32, 528/396, 405
See application file for complete search history.

(56) References Cited

U.S. PATENT DOCUMENTS

| | | | | |
|---|---|---|---|---|
| 3,423,376 A * | 1/1969 | Gobran et al. | | 526/279 |
| 3,560,589 A | 2/1971 | Sato et al. | | |
| 4,152,499 A * | 5/1979 | Boerzel et al. | | 525/381 |
| 6,177,519 B1 | 1/2001 | Chung et al. | | |
| 6,194,597 B1 | 2/2001 | Faust et al. | | |
| 6,284,716 B1 * | 9/2001 | Gunther et al. | | 508/235 |
| 6,380,316 B1 * | 4/2002 | Bahadur et al. | | 525/263 |
| 2007/0048672 A1 * | 3/2007 | Choi et al. | | 430/311 |

FOREIGN PATENT DOCUMENTS

| | | | | |
|---|---|---|---|---|
| DE | 27 30 008 A1 | | 1/1979 | |
| JP | 61211363 A * | | 9/1986 | C08L 77/00 |
| WO | WO 8805449 A1 * | | 7/1988 | C08L 23/00 |
| WO | WO-95/07944 A1 | | 3/1995 | |

* cited by examiner

*Primary Examiner* — Richard A Huhn
(74) *Attorney, Agent, or Firm* — Novak Druce Connolly Bove + Quigg LLP

(57) ABSTRACT

The application provides a terpolymer obtainable by copolymerizing (A) 1% to 70% by weight of at least one electron-deficient olefin, an example being an anhydride of a monoethylenically unsaturated $C_4$ to $C_6$ dicarboxylic acid, (B) 1% to 85% by weight of at least one olefin which on its olefinic double bond carries only hydrogen atoms and/or carbon atoms without electron-withdrawing substituents, an example being an isobutene homopolymer or copolymer having a number-average molecular weight of 100 to 500 000, and (C) 1% to 70% by weight of at least one alkoxyvinylsilane, and also derivatives of this terpolymer that are obtainable by modification or crosslinking.

15 Claims, No Drawings

TERPOLYMER OF ELECTRON-DEFICIENT OLEFINS, OLEFINS WITHOUT ELECTRON-WITHDRAWING SUBSTITUENTS, AND ALKOXYVINYLSILANES

CROSS-REFERENCE TO RELATED APPLICATIONS

This application claims benefit (under 35 USC 119(e)) of U.S. Provisional Application 61/380,329, filed Sep. 7, 2010 which is incorporated by reference.

BACKGROUND OF THE INVENTION

The present invention relates to a new polymer which in addition to hydrocarbon units contains siloxane groups. This is a terpolymer which is obtainable by copolymerizing
(A) 1% to 70% by weight of at least one electron-deficient olefin,
(B) 1% to 85% by weight of at least one olefin which on its olefinic double bond carries only hydrogen atoms and/or carbon atoms without electron-withdrawing substituents, and
(C) 1% to 70% by weight of at least one alkoxyvinylsilane, the sum of the % by weight of components (A), (B), and (C) making 100% by weight.

The present invention further relates to a process for preparing this terpolymer and to derivatives of this terpolymer which are obtainable by thermal crosslinking, by hydrolytic crosslinking, by modification with alcohols and/or amines, or by treatment with aqueous or alcoholic alkali metal hydroxide solution or aqueous or alcoholic amine solution.

Polymers with hydrocarbon chains and siloxane groups are able to crosslink and are therefore starting materials for adhesives or sealants or for compositions for surface modification. Such products are therefore of great industrial interest.

A variety of preparation processes are common knowledge for polymers having hydrocarbon chains and siloxane groups. For instance, U.S. Pat. No. 6,177,519 (1) describes the grafting of a polyolefin with a vinylsiloxane. Kennedy and Ivan in Carbocationic Macromolecular Engineering, Hanser-Verlag, 1991, pages 142, 143, 174, and 175 (2), describe the living cationic polymerization of 2-methylpropene, the reaction being terminated with an allylsilane, and the subsequent hydrosilylation of the α,ω-diene. Known from U.S. Pat. No. 6,194,597 (3), moreover, is the copolymerization of isobutene with silylstyrene or silylmethylstyrene. Common to all these processes is their technical cost and inconvenience, since they are multistage processes and/or require removal of large amounts of heat in the polymerization at low temperatures, and/or because special agents must be used, which often are not available commercially.

It was therefore surprising that polymers of this kind with hydrocarbon chains and siloxane groups can be prepared in a hitherto unknown single-stage reaction from commercially available monomers at low energy cost, i.e., in general without cooling.

The present invention accordingly provides the terpolymer identified at the outset, which is obtainable by simple copolymerization of the components (A), (B), and (C).

Copolymers of vinylalkoxysilanes with anhydrides of unsaturated acids such as maleic anhydride are known from U.S. Pat. No. 3,560,589 (4). Such copolymers are described therein as constituents of epoxy resins.

Copolymers of vinyltrialkoxysilanes with maleic anhydride, in a form in which they have undergone partial or complete transformation to the corresponding monoesters, are known from DE-A 27 30 008 (5). Such copolymers are recommended therein for the preparation of reactive silyl compounds which can be used as adhesion promoters, coating materials or filtration aids.

WO 95/07944 (6) describes terpolymers of (a) 20 to 60 mol % of at least one monoethylenically unsaturated $C_4$ to $C_6$ dicarboxylic acid or its anhydride, (b) 10 to 70 mol % of at least one oligomer of propene of a branched 1-olefin having 4 to 10 carbon atoms such as oligoisobutene, and (c) 1 to 50 mol % of at least one monoethylenically unsaturated compound which is copolymerizable with the monomers (a) and (b). Monoethylenically unsaturated compounds contemplated are linear 1-olefins, unsaturated monocarboxylic acids, vinyl and allyl alkyl ethers, esters of unsaturated monocarboxylic or dicarboxylic acids, vinyl and allyl esters of saturated monocarboxylic acids, N-vinylcarboxamides, and N-vinyl compounds of nitrogen-containing heterocycles.

A SUMMARY OF THE INVENTION

Copolymers and terpolymers of the kind described in documents (4), (5), and (6), for example, nevertheless still have a potential for improvement in terms of their physical and/or performance properties. An object of the invention, therefore, is to provide new polymeric systems which in terms of their physical and/or performance properties contain still more improvement possibilities, flexibility, and room for maneuver in terms of the various conceivable applications in industry. The terpolymer defined at the outset has been found accordingly.

With the terpolymer of the invention, it is the monomer components (C) which are primarily responsible for the desired improvement in the physical and/or performance properties of the polymer.

A DETAILED DESCRIPTION OF THE INVENTION

As component (A) it is usual to use those olefin monomers carry, in a position α to the olefinic double bond, one or more electron-withdrawing substituents which (for example, via conjugation of the Π electron systems) lower the electron density of the olefinic double bond. In one preferred embodiment, the at least one electron-deficient olefin of component (A) carries in its olefinic double bond at least one, more particularly one or two, electron-withdrawing substituent(s) selected from the group consisting of —CO— (carbonyl), —CN (cyano), —$NO_2$ (nitro), and —$SO_2$— (sulfo). The group —CO— here is generally part of a keto function, an aldehyde function or, in particular, a carboxyl function in the form, for example, of a free carboxylic acid, a carboxylic ester, a carboxamide, a carboximide or a cyclic or noncyclic carboxylic anhydride. The group —$SO_2$— here is generally part of a sulfone function, a sulfonic acid, a sulfonic ester, a sulfonamide or a sulfonimide.

Typical examples of such electron-deficient olefins of component (A) are acrylic acid, its esters such as methyl acrylate, ethyl acrylate or n-butyl acrylate, the amides thereof and the imides thereof, acrylonitrile, methacrylic acid, its esters such as methyl methacrylate, ethyl methacrylate or n-butyl methacrylate, the amides thereof and the imides thereof, methacrylonitrile, maleic acid, its monoesters and diesters such as monomethyl maleate, dimethyl maleate, monoethyl maleate or diethyl maleate, the monoamides and diamides thereof, the imides thereof, the mononitrile and dinitrile thereof, and also fumaric acid, its monoesters and diesters such as monomethyl fumarate, dimethyl fumarate, monoethyl fumarate or diethyl fumarate, the monoamides and diamides thereof, and the mononitrile and dinitrile thereof. Contemplated as ester alcohol residues and as possible substituents on the stated amides and imides are, primarily, $C_1$ to $C_{20}$ alkyl radicals. It is also possible to use mixtures of the stated electron-deficient olefins as component (A).

Very particular preference is given to a terpolymer which is obtainable from at least one anhydride of a monoethylenically unsaturated $C_4$ to $C_6$ dicarboxylic acid as component (A). Contemplated in particular here are the anhydrides, having a cyclic structure, of fumaric acid, itaconic acid, mesaconic acid, methylenemalonic acid, citraconic acid, and, in particular, maleic acid.

As component (B) it is usual to use those olefin monomers which in a position α to the olefinic double bond carry only carbon atoms without electron-withdrawing substituents, and/or hydrogen atoms. In this case, in contrast to component (A), the electron density of the olefinic double bond is not lowered by conjugation with a Π electron system of a carbonyl (—CO), cyano (—CN), nitro (—$NO_2$) or sulfo (—$SO_2$—) group. The olefins of component (B) are mostly pure hydrocarbon compounds which may carry an electron-withdrawing substituent such as —CO—, —CN, —$NO_2$ or —$SO_2$—, if at all, at a relative large distance from the olefinic double bond, in other words in position β or even further away. It is also possible to use mixtures of the stated non-electron-deficient olefins as component (B).

Typical examples of non-electron-deficient olefins of this kind, of component (B), are cyclic olefins such as cyclopentene, cyclohexene or cycloheptene, α-olefins such as ethylene, propylene, 2-methylpropene (isobutene), but-1-ene, hex-1-ene, oct-1-ene, 2,2,4-trimethylpent-1-ene, dec-1-ene or dodec-1-ene, vinylaromatics such as styrene, α-methylstyrene or $C_1$ to $C_4$ alkylstyrenes, examples being 2-, 3-, and 4-methylstyrene, and also 4-tert-butylstyrene, and also oligomers and polymers of such α-olefins, olefins having an internal double bond such as but-2-ene or copolymers of different α-olefins such as the copolymer of isobutene and dec-1-ene or of isobutene and styrene, α-methylstyrene or $C_1$ to $C_4$ alkyl-styrenes. The stated oligomers and polymers have—originating predominantly from chain termination reactions—mostly terminal olefinic double bonds, which allow their further capacity for polymerization in the sense of the present invention.

Among the α-olefin polymers, polyisobutene is especially important, since it is a commercially customary material which is frequently used in industry. The preparation of polyisobutene by polymerization of isobutene with Lewis acids such as aluminum trichloride, boron trifluoride or titanium tetrachloride as catalyst is well established. Depending on the reaction temperature, catalyst, and purity of the isobutene feedstock, the product is a low, medium or high molecular mass polyisobutene. An overview of processes for polyisobutene preparation is also found in Ullmann's Encyclopedia of Industrial Chemistry, 5th Edition, Vol. A 21, 1992, pages 555 to 561. Kennedy and Ivan in "Carbocationic Macromolecular Engineering", Hanser-Verlag, 1991, describe further methods (living polymerization) for preparing polyisobutene. As well as the pure isobutene homopolymers, isobutene copolymers are also of importance as component (B).

One preferred embodiment of the present invention is a terpolymer which is obtainable from an isobutene homopolymer or copolymer having a number-average molecular weight $M_n$ of 100 to 500 000, preferably of 120 to 50 000, more particularly of 350 to 20 000, especially of 500 to 2500, as component (B). The term "Isobutene homopolymer" for the purposes of the present invention also embraces oligomeric isobutenes, such as dimeric, trimeric, tetrameric, pentameric, hexameric, and heptameric isobutene.

As isobutene homopolymer or copolymer it is possible in principle to use all customary and commercially available polyisobutene. Customary and commercially available polyisobutenes are usually isobutene homopolymers or isobutene copolymers having a predominant fraction of isobutene units [—$CH_2$—$C(CH_3)_2$—]. It is preferred to use what is called a "reactive" polyisobutene. "Reactive" polyisobutenes differ from the "low-reactive" polyisobutenes in a higher quantity of double bonds disposed terminally. Thus, reactive polyisobutenes contain at least 50 mol %, based on the total number of polyisobutene macromolecular units, of such terminally disposed double bonds. Particularly preferred are polyisobutenes having at least 60 mol %, and more particularly having at least 80 mol %, based on the total number of polyisobutene macromolecular units, of terminally disposed double bonds. The terminally disposed double bonds may be both vinyl double bonds [—CH=$C(CH_3)_2$] (β-olefin) and vinylidene double bonds [—CH—$C(=CH_2)$—$CH_3$] (α-olefin).

One preferred embodiment of the present invention is a terpolymer which is obtainable from an isobutene homopolymer or copolymer having a terminal vinylidene double bond content of at least 60%, more particularly of at least 80 mol %, as component (B).

It is usual to use isobutene homopolymers and/or copolymers which have uniform or largely uniform polymer frameworks. These, for the purposes of the present invention, are usually those polymers constructed to an extent of at least 85%, preferably at least 90%, and more particularly at least 95%, by weight of isobutene units [—$CH_2$—$C(CH_3)_2$—].

Furthermore, the isobutene homopolymers or copolymers used as component (B) typically have a polydispersity index (PDI) of 1.05 to 10, more particularly 1.05 to 4, especially 1.05 to 2.0. By polydispersity is meant the ratio of weight-average molecular weight $M_w$ to number-average molecular weight $M_n$ (PDI=$M_w/M_n$).

Isobutene homopolymers or copolymers for the purposes of the present invention also comprehend all polymers which are obtainable by cationic or living cationic polymerization and which comprise in copolymerized form preferably at least 60% by weight of isobutene, more preferably at least 80% by weight, with even greater preference at least 90% by weight, and especially at least 95% by weight, of isobutene. In addition, these polymers may comprise in copolymerized form further butene isomers such as 1- or 2-butene, and also olefinically unsaturated monomers which are different therefrom and are copolymerizable with isobutene under cationic polymerization conditions.

Suitable isobutene feedstocks for the preparation of isobutene homopolymers or copolymers, and able to serve as reactants from the present invention, are, accordingly, not only isobutene itself but also isobutene-containing $C_4$ hydrocarbon streams, examples being $C_4$ raffinates, $C_4$ cuts from isobutene dehydrogenation, $C_4$ cuts from steamcrackers, FCC ("Fluid Catalyzed Cracking") crackers, provided they have been largely freed from 1,3-butadiene they contain. Particularly suitable $C_4$ hydrocarbon streams generally contain less than 500 ppm, preferably less than 200 ppm, of butadiene. Where $C_4$ cuts are used as feedstock material, the hydrocarbons other than isobutene may take on the role of an inert solvent.

Suitable monomers, copolymerizable under cationic polymerization conditions, for isobutene copolymers include vinylaromatics such as styrene and α-methylstyrene, $C_1$ to $C_4$ alkyl-styrenes such as 2-, 3-, and 4-methylstyrene, and also 4-tert-butylstyrene, isoolefins having 5 to 10 C atoms such as 2-methylbut-1-ene, 2-methylpent-1-ene, 2-methylhex-1-ene, 2-ethylpent-1-ene, 2-ethylhex-1-ene, and 2-propylhept-1-ene.

Polyisobutenes suitable as component (B) are all isobutene homopolymers or copolymers obtainable by customary cationic or living cationic polymerization.

Preference, however, is given to "reactive" polyisobutenes, which have been described above.

Polyisobutenes which are available commercially and possess suitability as component (B) are, for example, the Glissopal® products from BASF SE such as Glissopal 550, Glissopal 1000, and Glissopal 2300 (the Glissopal products constituting reactive polyisobutenes), and also the Oppanol® products from BASF SE, such as Oppanol B10, B12, and B15.

Suitable alkoxyvinylsilanes for the monomer component (C) are preferably compounds having the general formula I

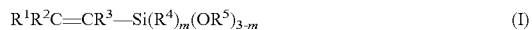

$$R^1R^2C=CR^3-Si(R^4)_m(OR^5)_{3-m} \quad (I)$$

in which n is the number 0, 1 or 2, $R^1$, $R^2$, $R^3$, $R^4$, and $R^5$ may be identical or different and are $C_1$ to $C_{20}$ alkyl, $C_5$ to $C_{20}$ cycloalkyl, $C_6$ to $C_{20}$ aryl or $C_7$ to $C_{20}$ aralkyl radicals, and $R^1$, $R^2$, $R^3$, and $R^4$ may also be hydrogen.

For the purpose of illustrating the present invention, especially for particularizing the components (A) and (C), the expression "$C_1$ to $C_{20}$ alkyl" encompasses corresponding straight-chain and branched alkyl groups. These are preferably straight-chain or branched $C_1$ to $C_{10}$ alkyl, more particularly $C_1$ to $C_8$ alkyl, and especially $C_1$ to $C_4$ alkyl groups. Examples of such alkyl groups are methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, 2-ethylhexyl, 2-propylheptyl, n-nonyl, and n-decyl.

Further suitable as such alkyl radicals are also similar hydrocarbyl radicals which may be interrupted by heteroatoms such as oxygen, for example, or may incorporate aromatic or heterocyclic rings.

The expression "$C_5$ to $C_{20}$ cycloalkyl" in the sense of the present invention encompasses unsubstituted and substituted cycloalkyl groups, preferably $C_5$ to $C_7$ cycloalkyl groups such as cyclopentyl, cyclohexyl or cycloheptyl. In the case of substitution these groups may carry 1, 2, 3, 4 or 5, preferably 1, 2 or 3, substituents. These substituents are then typically the above-stated alkyl radicals.

The expression "$C_6$ to $C_{20}$ aryl" in the sense of the present invention encompasses unsubstituted and substituted aromatic radicals such as phenyl, o-, m- or p-tolyl, xylyl or naphthyl. Substituents occurring here are typically the above-stated alkyl radicals.

The expression "$C_7$ to $C_{20}$ aralkyl" in the sense of the present invention encompasses alkyl groups substituted by aromatic radicals, such as benzyl, o-, m- or p-methylbenzyl, 1-phenylethyl, 2-phenylethyl, 3-phenylpropyl or 4-phenylbutyl.

In addition to the vinyl radical, which has a polymerizable ethylenic double bond and may be substituted by $R^1$, $R^2$ and/or $R^3$, the alkoxyvinylsilanes of monomer component (C) carry one, two or three radicals $—OR^5$, which are preferably $C_1$ to $C_{20}$ alkyloxy radicals, more particularly $C_1$ to $C_8$ alkyloxy radicals, especially $C_1$ to $C_4$ alkyloxy radicals, and may be identical or different, with remaining, as yet unoccupied valences of the silicon atom, if there are such, being satisfied preferably by $C_1$ to $C_4$ alkyl, $C_5$ to $C_7$ cycloalkyl, phenyl and/or hydrogen as substituents $R^4$.

In one preferred embodiment the terpolymer of the invention is obtainable from at least one trialkoxyvinylsilane of the general formula Ia

$$H_2C=CH-Si(OR^5)_3 \quad (Ia)$$

in which all three alkoxy radicals are identical and $R^5$ has the above-stated definition, as component (C).

Particularly preferred representatives of the compounds Ia are tri($C_1$ to $C_{20}$ alkyloxy)vinylsilanes, more particularly tri ($C_1$ to $C_8$ alkyloxy)vinylsilanes, especially tri($C_1$ to $C_4$ alkyloxy)vinylsilanes, in which the expression "alkyl" has the above-stated definition of $C_1$ to $C_{20}$ alkyl radicals and also similar hydrocarbyl radicals which may be interrupted by heteroatoms such as oxygen, for example, or may incorporate aromatic or heterocyclic rings.

Typical examples of compounds of the general formula I are vinyltrimethoxysilane, vinyltriethoxysilane, vinyltripropoxysilane, vinyltriisopropoxysilane, vinyltributoxysilane, vinyltris(β-methoxyethoxy)silane, vinylmethyldiethoxysilane, vinylethyldimethoxysilane, vinylcyclohexyldimethoxysilane, vinylphenyldimethoxysilane, vinyldimethylmonoethoxysilane, and vinylmethylphenylmonoethoxysilane.

The terpolymer of the invention is preferably obtainable by copolymerizing
(A) 5% to 60%, more particularly 10% to 40%, by weight of at least one electron-deficient olefin,
(B) 5% to 80%, more particularly 15% to 70%, by weight of at least one olefin which on its olefinic double bond carries only hydrogen atoms and/or carbon atoms without electron-withdrawing substituents, and
(C) 5% to 60%, more particularly 15% to 50%, by weight of at least one alkoxyvinylsilane,
the sum of the % by weight of components (A), (B), and (C) in each case making 100% by weight.

The terpolymer of the invention is more particularly obtainable by copolymerizing
(A) 5% to 60%, more particularly 10% to 40%, by weight of at least one anhydride of a monoethylenically unsaturated $C_4$ to $C_6$ dicarboxylic acid,
(B) 5% to 80%, more particularly 15% to 70%, by weight of an isobutene homopolymer or copolymer having a number-average molecular weight $M_n$ of 100 to 500 000, and
(C) 5% to 60%, more particularly 15% to 50%, by weight of at least one alkoxyvinylsilane,
the sum of the % by weight of components (A), (B), and (C) making 100% by weight.

In one preferred embodiment the terpolymer of the invention has a substantially alternating structural composition. In this case, in the polymer chain, it is usual for one monomer unit (A) to alternate in each case with one monomer unit (B) or with one monomer unit (C). The monomer units (B) and (C) are preferably distributed randomly. The ratio of the monomer units (A) to the sum of (B) and (C) is usually from 0.9:1.1 to 1.1:0.9.

In another embodiment the monomer units may be distributed more randomly. Thus the electron-deficient olefins (A) may be present in excess, with the ratio of the monomer units (A) to the sum of (B) and (C) being from more than 1.1:0.9 to 1.5:0.5. Furthermore, however, the electron-deficient olefins (A) may also be in a deficit amount, with the ratio of the monomer units (A) to the sum of (B) and (C) being from less than 0.9:1.1 to 0.5:1.5.

The terpolymer of the invention in general has a number-average molecular weight $M_n$ of 500 to 2 000 000, more particularly of 750 to 200 000, in particular of 1000 to 75 000 (determined by the analytic ultracentrifuge).

The terpolymer of the invention in general has a polydispersity index (PDI) of 1.5 to 15, more particularly of 2.0 to 12, in particular of 2.5 to 8.

The terpolymer of the invention may take the form—depending on the amount of monomer units of component (B) present—of a brittle resin [primarily at low levels of (B)], a viscous oil or a soft resin [primarily at high levels of (B)].

The formula scheme below is intended to illustrate the formation of a typical representative of the terpolymer of the invention (n=number, minus 2, of the isobutene units in the polyisobutene employed; PIB=remaining structure of the polyisobutene unit):

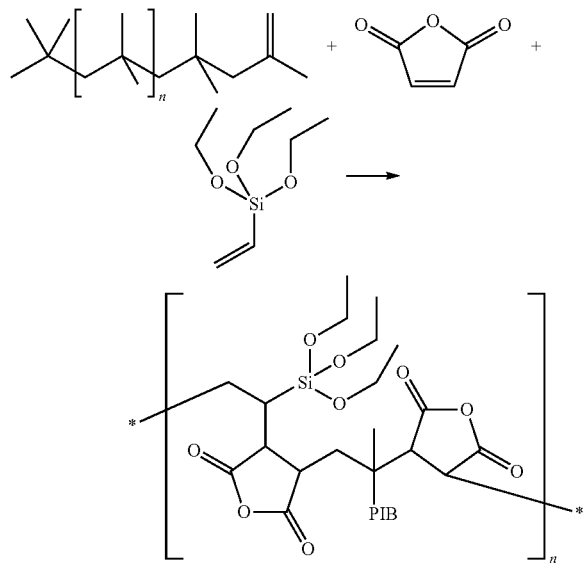

The present invention also provides a process for preparing the terpolymer of the invention that comprises copolymerizing components (A), (B), and (C) with one another free-radically in bulk, in solution or in suspension.

The methods of free-radical bulk, solution, and suspension polymerization are well known to the skilled worker and therefore do not need to be explained in every detail here. Reference is made, by way of example, to overview literature such as Houben-Weyl, Methoden der organischen Chemie, 4th edition, G. Thieme Verlag, volume 14 and supplementary volume E20, and to the original references cited therein. Pages 15-73 of the E20 volume recite chemical initiators for the free-radical polymerization, while pages 74-93 of the same volume describe the initiation of a polymerization using high-energy radiation. A further summary in this respect is the Handbook of Polymer Synthesis, 2nd edition, 2005, Marcel Dekker. Below, however, there is a discussion of the process parameters which may be critical for carrying out the free-radical bulk, solution or suspension polymerization of components (A), (B), and (C) for the terpolymer of the invention.

With all the stated polymerization processes, as a general rule, operation takes place in the absence of oxygen, preferably in a stream of nitrogen. The polymerization is conducted typically at temperatures of 0 to 150° C., more particularly at 20 to 130° C., especially at 40 to 120° C., and at a pressure of 0.5 to 10 bar, more particularly 0.7 to 1.3 bar. The polymerization may be carried out continuously or batchwise. In the case of solution and suspension polymerization methods it is advantageous to use a solvent which is not reactive under polymerization conditions an example being a hydrocarbon such as toluene or xylene, a halogenated hydrocarbon such as dichloromethane, or a mixture hereof, as solvent or suspension medium, respectively. In another variant, use is made deliberately of solvents (also in a mixture) which are able under polymerization conditions to react (e.g., ketones such as acetone or butanone) in order to terminate free-radical chains and so adjust the molecular weight.

Examples of polymerization initiators that are suitable in this context include peroxide compounds such as tert-butyl peroxybenzoate, tert-butyl perpivalate, tert-butyl perneodecanoate, tert-butyl perethylhexanoate, tert-butyl perisobutyrate, di-tert-butyl peroxide, di-tert-amyl peroxide, diacetyl peroxidicarbonate or dicyclohexyl peroxidicarbonate, or azo compounds such as 2,2'-azobis(isobutyronitrile). These polymerization initiators may be used alone or in a mixture with one another. The polymerization, however, may also be initiated by radiation, as for example by ultraviolet light, by gamma rays or by laser beams.

Also provided for the present invention, as a derivative of the terpolymer of the invention, is a thermally crosslinked terpolymer which is obtainable by heating the terpolymer of the invention at temperatures above 80° C. (for example, at 100° C. to 120° C. or at 120° C. to 150° C.) for at least 10 minutes. No significant amount of alcohol is eliminated during this procedure, and the crosslinking takes place in general largely through formation of Si—O—Si bridges; any alkoxy groups that are possibly eliminated will be scavenged by the dicarboxylic anhydride moieties, which in the process are ring-opened to form carboxylate moieties. Since water is not needed in this step, exclusion of moisture may be advantageous.

The formula scheme below is intended to illustrate, by way of example, a typical structure of a thermally crosslinked terpolymer of this kind (PIB=residual structure of the polyisobutene unit):

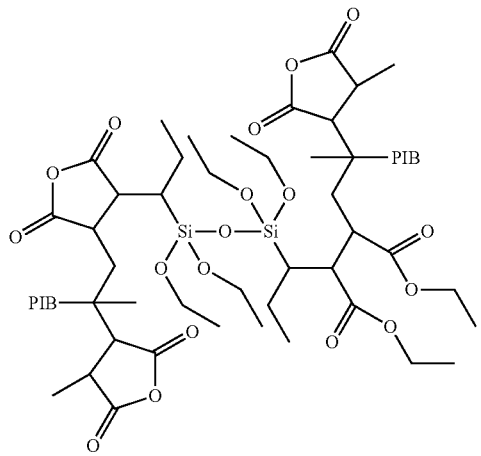

Also provided for the present invention, furthermore, as a derivative of the terpolymer of the invention is a modified terpolymer which is obtainable by reacting the terpolymer of the invention with monohydric or polyhydric alcohols and/or with monofunctional or polyfunctional amines. The alcohols and amines are contacted with the terpolymer of the invention, via the gas phase, for example, or in liquid form by wetting or spraying, in corresponding, usually low, amounts; alternatively, the alcohols or amines can be contacted and reacted with a solution of the terpolymer of the invention in an inert solvent such as toluene. The reaction time in this case is from a few minutes to a few days, and the reaction is performed with amines typically at temperatures from 10° C. to 60° C., whereas, in the case of alcohols, a range from 50° C. to 120° C. has been found appropriate. In these ranges, in general, crosslinking through formation of Si—O—Si bridges is not yet brought about. Alcohols which can be used in these reactions include, for example, methanol, ethanol, propanol, isopropanol, tert-butanol, methoxyethanol, ethylene glycol or glycerol, while amines which can used include, for example, monobutylamine, diethylamime, trimethylamine, triethylamine, ethylenediamine, 3-(N,N-dimethylamino)propylamine or else alkanolamines such as triethanolamine or triisopropanolamine. The alcohols and amines may also comprise further functional moieties such as siloxane groups for the further modification of the polymer. Examples thereof are 3-aminopropyltriethoxysilane, 3-aminoethyltriethoxysilane, and 3-aminopropyltrimethoxysilane.

It is also possible to use polyethylene oxides or polypropylene oxides in a molecular weight range from 200 to 10 000. In one case the polymer chains are terminated difunctionally, in other words at both ends, with an —OH group or —NH$_2$ group; the polymer is difunctional. In another case, one end is etherified, i.e., R—O— (where R is any desired hydrocarbon radical) is one chain end, while the other end may be —OH or —NH$_2$; these polymers are monofunctional.

The reaction of monofunctional amines and alcohols proceeds to start with substantially without crosslinking, since in solution there is neither gelling nor precipitation. As a result of prolonged heating, for example over 1 to 3 or 2 to 8 hours, at higher temperatures, at 50° C. to 90° C. or at 70° C. to 150° C., for example, there may also be, as a follow-on reaction, a crosslinking, with formation of Si—O—Si bonds. The formula scheme below is intended to illustrate, by way of example, a typical structure of a substituted terpolymer of this kind with ring-opened anhydride moieties (PIB=residual structure of the polyisobutene unit):

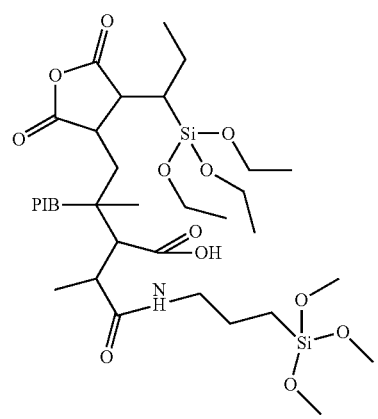

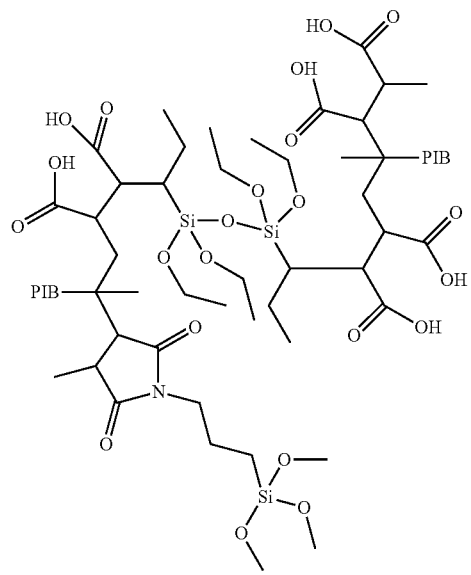

Also provided by the present invention, furthermore, as a derivative of the terpolymer of the invention is a hydrolytically crosslinked terpolymer, which is obtainable by reacting the terpolymer of the invention with water. This water may be contacted in the form of steam, atmospheric moisture, or small amounts of liquid water with the terpolymer of the invention. The reaction time in this case is from a few minutes to a few days and the reaction is typically performed at temperatures from 10° C. to 60° C. In this range, in general, crosslinking is again brought about largely by formation of Si—O—Si bridges; the dicarboxylic anhydride moieties are then ring-opened hydrolytically to form carboxylate moieties, and free carboxyl groups are formed.

The formula scheme below is intended to illustrate, by way of example, a typical structure of a hydrolytically crosslinked terpolymer of this kind with ring-opened anhydride moieties, with prior crosslinking via Si—O—Si bridges (PIB=residual structure of the polyisobutene unit):

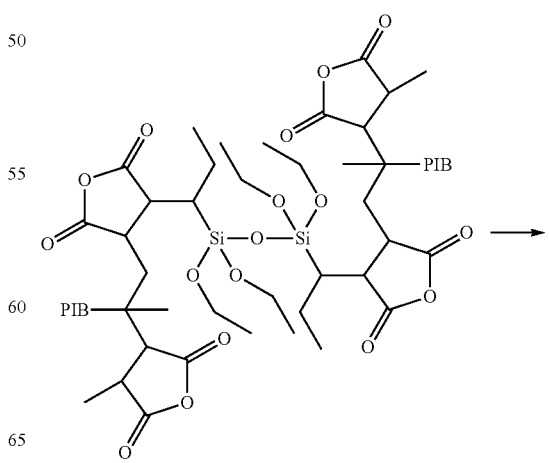

-continued

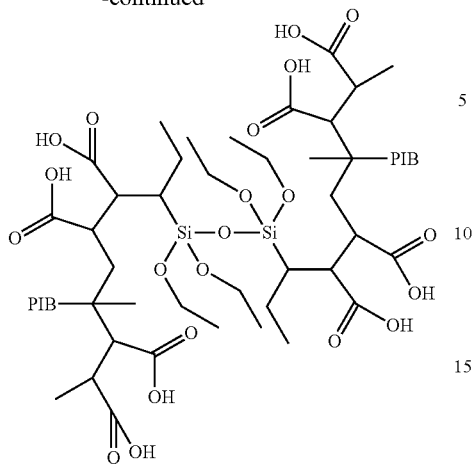

In the course of the reaction of polyfunctional (functionality of two or more) amines and alcohols, crosslinking takes place simply; in solution, gelling and precipitation are observed.

Also provided for the present invention, moreover, as a derivative of the terpolymer of the invention, is a terpolymer which is crosslinked by way of polyamines and/or polyols and which is obtainable by reacting the terpolymer of the invention with polyamines (polyfunctional amines) and/or polyols (polyhydric or polyfunctional alcohols). The reaction time is from a few minutes to few days and the reaction is typically performed at temperatures from 10° C. to 140° C. In this range, then, in general, the dicarboxylic anhydride moieties are ring-opened to form carboxamide or carboxylic ester moieties, and this produces crosslinking. The carboxamide groups may also undergo cyclization with a free carboxylic acid to form imides. In addition, crosslinking may likewise be brought about by formation of Si—O—Si bridges.

Also provided for the present invention, moreover, as a derivative of the terpolymer of the invention, is an aqueous-alkaline, alcoholic-alkaline, alcoholic-aminic or aqueous-basic terpolymer preparation which is obtainable by treating the terpolymer of the invention with aqueous or alcoholic alkali metal hydroxide solution or with aqueous or alcoholic amine solution. The treatment time in this case is usually 10 to 100 minutes and the treatment is typically performed at 20° C. to 60° C. The usual products of this treatment are true solutions, emulsions, dispersions or gelatinous preparations of the terpolymer. In this case the siloxane moieties are mostly hydrolyzed largely to form silicate moieties (—$SiO_3^{3-}$) and the dicarboxylic anhydride moieties are hydrolytically ring-opened to form carboxylate moieties (—$COO^-$). Where an aqueous amine solution is used, the latter are present wholly or partly in the form of carboxamide moieties. Alkali metal hydroxide solutions which can be used in this context include, in particular, aqueous or ethanolic sodium or potassium hydroxide solutions. Amines which can be used in this case are, for example, monobutylamine, diethylamime, trimethylamine, triethylamine, diamines or polyamines such as ethylenediamine or 3-(N,N-dimethylamino)propylamine, or else alkanolamines such as triethanolamine or triisopropanolamine; where aqueous diamines or polyamines are used, and where only one amine function is reactive, betainelike structures usually occur. The resulting alcoholic-alkaline or alcoholic-basic or aqueous-alkaline or aqueous-basic terpolymer preparation is generally storage-stable for a relatively long time.

The formula scheme below is intended, by way of example, to illustrate two typical structures of an aqueously hydrolyzed terpolymer preparation of this kind—in one case with aqueous sodium hydroxide solution, in the other with aqueous 3-(N,N-dimethylamino)propylamine—(PIB=residual structure of the polyisobutene unit):

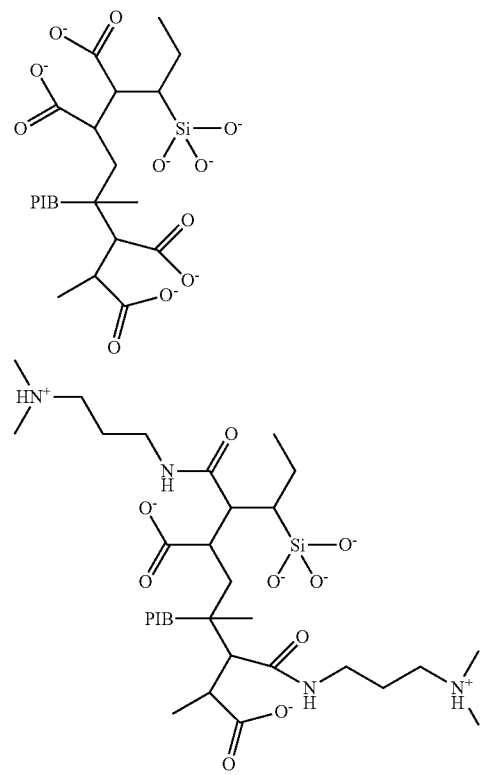

The terpolymer of the invention and its described derivatives are especially suitable for the surface treatment of oxidic surfaces, for example, as adhesives and sealants or as an ingredient thereof, and as a polymer additive.

The examples which follow are intended to illustrate the present invention, without limiting it.

EXAMPLE 1

Polymerization of Maleic Anhydride, Polyisobutene, and Vinyltriethoxysilane 95 g (0.5 mol) of vinyltriethoxysilane, 80 ml of toluene, 50 g of commercial reactive polyisobutene with $M_n$=1000 (Glissopal® 1000) and 50 g of maleic anhydride were charged to a 500 ml four-neck flask and this initial charge was heated to an internal temperature of 95° C. The resulting reaction mixture was subjected to nitrogen gas via an inlet tube. 4 g of tert-butyl peroxybenzoate, in solution in 40 ml of toluene, were added over 4 hours. In the course of the reaction, the hazy batch took an oily clarity and homogeneity (solids content: 66% by weight). For work-up, the solvent was removed by distillation on a rotary evaporator at 130° C. and at 500 to 8 mbar. This gave 115 of the desired terpolymer in the form of a viscous oil, which rapidly solidified to gave a brittle, glass-like residue, which was amenable to characterization by $^1$H NMR spectroscopy.

$^1$H NMR (400 MHz, 16 scans, CDCl$_3$): The signals for maleic anhydride (δ=7.00 ppm) and also for the double bonds of vinylsiloxane (δ=6.13 ppm, 6.02 ppm and 5.90 ppm) and polyisobutene (δ=5.16 ppm, 4.84 ppm and 4.64 ppm) had disappeared. Still present were the signals for the ethoxy function (δ=3.84 ppm and 1.24 ppm) and for the polyisobutene (δ=1.42 ppm, 1.11 ppm and 0.99 ppm). Newly appearing were broad signals, which can be assigned to the new polymer chain (δ=3.4 ppm to 2.4 ppm: CH$_2$—CH—CO; δ=2.2 ppm to 1.5 ppm: CH$_2$—CH—CO).

EXAMPLES 2-13

Further Polymerization Experiments

In the same way as in example 1, the polymerization experiments compiled in the table below were carried out with the amounts of monomers reported therein (MAn=maleic anhydride; n-BA=n-butyl acrylate; Glissopal® 1000=reactive polyisobutene with $M_n$=1000; Glissopal 2300=reactive polyisobutene with $M_n$=2300; Oppanol® B10=polyisobutene with $M_n$=10 000; VTEOS=vinyltriethoxysilane).

| Example | MAn | n-BA | Glissopal 1000 | Glissopal 2300 | Oppanol B10 | VTEOS |
|---|---|---|---|---|---|---|
| 2 | 200 g | — | 200 g | — | — | 380 g |
| 3 | 100 g | — | 100 g | — | — | 190 g |
| 4 | 200 g | — | — | — | 340 g | 380 g |
| 5 | 20 g | — | 200 g | — | — | 38 g |
| 6 | 50 g | — | — | — | 340 g | 95 g |
| 7 | 98 g | — | 200 g | — | — | 162 g |
| 8 | 88 g | — | — | 415 g | — | 145 g |
| 9 | 98 g | — | — | 690 g | — | 142 g |
| 10 | 245 g | — | 175 g | — | — | 447 g |
| 11 | 147 g | — | 360 g | — | — | 217 g |
| 12 | 98 g | — | — | 552 g | — | 144 g |
| 13 | 35 g | 19 g | 130 g | — | — | 71 g |

EXAMPLE 14

Thermal Crosslinking of the Terpolymer from Example 1

The terpolymer obtained as a viscous oil in example 1 was heated in a drying cabinet between two glass slides at 90° C. for 2 hours. A clear film of resin was formed between the slides.

EXAMPLE 15

Hydrolytic Crosslinking of the Terpolymer from Example 1 Using Atmospheric Moisture The terpolymer obtained as a viscous oil in example 1 was left to stand in the open on a watch glass for 8 h hours in humid air at room temperature. A clear, nontacky film of resin was formed. After being left to stand for a further 3 weeks at room temperature, the film became brittle and was easily removable from the watch glass.

EXAMPLE 16

Reaction of the Terpolymer from Example 2 with 3-Aminopropyltrimethoxysilane 280 g of the 68% strength by weight solution of the terpolymer in toluene, as obtained in example 2, were reacted with 27 g of 3-aminopropyltrimethoxysilane over the course of 1 hour at room temperature with stirring. There is no gelling or precipitation. The reaction mixture was analyzed by means of $^1$H NMR spectroscopy (400 MHz, 16 scans, CDCl$_3$). A new signal for the methylene group of the amide appeared, —CH$_2$—NH—CO— at δ=3.5 ppm (broad); a signal for —CH$_2$—NH$_2$ was no longer apparent.

EXAMPLE 17

Reaction of the Terpolymer from Example 2 with 3-Aminopropyltrimethoxysilane 800 g of a 68% strength by weight solution of the terpolymer in toluene, as obtained in example 2, were reacted with 154 g of 3-aminopropyltrimethoxysilane (diluted with 100 ml of toluene) over the course of 1 hour at room temperature with stirring. There is no gelling or precipitation. The reaction mixture was analyzed by means of $^1$H NMR spectroscopy (400 MHz, 16 scans, CDCl$_3$). A new signal for the methylene group of the amide appeared, —CH$_2$—NH—CO— at δ=3.5 ppm (broad); a signal for —CH$_2$—NH$_2$ was no longer apparent.

EXAMPLE 18

Dissolution of the Terpolymer from Example 2 in Aqueous Sodium Hydroxide Solution The terpolymer obtained in example 2 was freed fully from the solvent on a rotary evaporator, and the solid residue obtained was comminuted under cold conditions. 10 g of the dried polymer powder were dissolved in aqueous sodium hydroxide solution (2.1 g of sodium hydroxide in 35 g of water) over a period of 100 minutes at room temperature. The slightly hazy solution obtained could be diluted with water without instances of precipitation, and was stable on storage for a number of days. Evaporation of the water resulted in a clear film.

EXAMPLE 19

Dissolution of the Terpolymer from Example 2 in Aqueous 3-(N,N-Dimethylamino)Propylamine The terpolymer obtained in example 2 was freed fully from the solvent on a rotary evaporator, and the solid residue obtained was comminuted under cold conditions. 10 g of the dried polymer powder were dissolved in a solution of 2.7 g of 3-(N,N-dimethylamino)propylamine in 35 g of water over a period of 100 minutes at room temperature. The slightly hazy solution obtained could be diluted with water without instances of precipitation, and was stable on storage for a number of weeks. Evaporation of the water resulted in a clear film.

The invention claimed is:
1. A terpolymer obtainable by copolymerizing:
(A) 1% to 70% by weight of at least one electron-deficient olefin;
(B) 1% to 85% by weight of at least one olefin which on its olefinic double bond carries only hydrogen atoms and/or carbon atoms without electron-withdrawing substituents and which is an isobutene homopolymer or copolymer having a number-average molecular weight $M_n$ of 100 to 500,000; and

(C) 1% to 70% by weight of at least one alkoxyvinylsilane, wherein the sum of the percentages by weight of components (A), (B), and (C) does not exceed 100% by weight.

2. The terpolymer according to claim 1 wherein the electron-deficient olefin as component (A) comprises at least one olefin which on its olefinic double bond carries at least one electron-withdrawing substituent selected from the group consisting of —CO—, —CN, —NO$_2$, and —SO$_2$—.

3. The terpolymer according to claim 1 wherein the electron-deficient olefin as component (A) comprises at least one anhydride of a monoethylenically unsaturated $C_4$ to $C_6$ dicarboxylic acid.

4. The terpolymer according to claim 1 wherein the isobutene homopolymer or copolymer as component (B) contains at least 60 mol % of terminal vinylidene double bonds.

5. The terpolymer according to claim 1 wherein the alkoxyvinylsilane as component (C) comprises at least one compound according to the following general formula (I):

  (I)

wherein m is 0, 1, or 2, and
$R^1$, $R^2$, $R^3$, and $R^4$ may be identical or different and are hydrogen, $C_1$ to $C_{20}$ alkyl, $C_5$ to $C_{20}$ cycloalkyl, $C_6$ to $C_{20}$ aryl, or $C_7$ to $C_{20}$ aralkyl radicals, and each $R^5$ may be identical or different and is $C_1$ to $C_{20}$ alkyl, $C_5$ to $C_{20}$ cycloalkyl, $C_6$ to $C_{20}$ aryl, or $C_7$ to $C_{20}$ aralkyl radicals.

6. The terpolymer according to claim 5 wherein the alkoxyvinylsilane as component (C) comprises at least one compound according to the following general formula (Ia):

  (Ia).

7. The terpolymer according to claim 1 which is obtainable by copolymerizing:

(A) 5% to 60% by weight of at least one anhydride of a monoethylenically unsaturated $C_4$ to $C_6$ dicarboxylic acid;

(B) 5% to 80% by weight of an isobutene homopolymer or copolymer having a number-average molecular weight $M_n$ of 100 to 500,000; and (C) 5% to 60% by weight of at least one alkoxyvinylsilane, wherein the sum of the percentages by weight of components (A), (B), and (C) does not exceed 100% by weight.

8. The terpolymer according to claim 1 having a substantially alternating structural composition.

9. The terpolymer according to claim 1 having a number-average molecular weight $M_n$ of 500 to 2,000,000.

10. The terpolymer according to claim 1 having a polydispersity of 1.5 to 15.

11. A process for preparing the terpolymer according to claim 1 which comprises copolymerizing components (A), (B), and (C) with one another free-radically in bulk, in solution, or in suspension.

12. A thermally crosslinked terpolymer obtained by heating the terpolymer according to claim 1 to temperatures about 80° C. for at least 10 minutes.

13. A modified and/or crosslinked terpolymer obtainable by reacting the terpolymer according to claim 1 with monohydric or polyhydric alcohols and/or monofunctional or polyfunctional amines.

14. A hydrolytically crosslinked terpolymer obtainable by reacting the terpolymer according to claim 1 with water.

15. An aqueous-alkaline, alcoholic-alkaline, aqueous-aminic, or alcoholic-aminic terpolymer preparation obtainable by treating the terpolymer according to claim 1 with aqueous or alcoholic alkaline metal hydroxide solution or with aqueous or alcoholic amine solution.

* * * * *